United States Patent [19]

Ferguson et al.

[11] Patent Number: 5,248,134
[45] Date of Patent: Sep. 28, 1993

[54] SNAP-IN UPPER MOUNT ASSEMBLY AND METHOD OF USE

[75] Inventors: Michael A. Ferguson, Okemos; Eugene M. Klco, Haslett, both of Mich.; Jack E. Smith, Dayton, Ohio; Richard M. Kleber, Clarkston, Mich.; Paul J. Mura, Franklin, Ohio; Troy M. Hill, Laingsburg, Mich.

[73] Assignee: General Motors Corporation, Detroit, Mich.

[21] Appl. No.: 838,995

[22] Filed: Feb. 21, 1992

[51] Int. Cl.⁵ ................................................ F16F 9/54
[52] U.S. Cl. ...................................... 267/220; 267/33; 267/293; 267/153; 188/321.11; 403/12; 403/224
[58] Field of Search ................... 267/33, 35, 220, 293, 267/153; 188/321.11; 403/12, 224

[56] References Cited

U.S. PATENT DOCUMENTS

| | | | |
|---|---|---|---|
| 2,297,483 | 9/1942 | Kuhne | 403/224 |
| 4,200,307 | 4/1980 | Szabo | 267/220 X |
| 4,434,977 | 3/1984 | Chiba et al. | 267/220 X |
| 4,771,996 | 9/1988 | Martinez, Jr. et al. | 267/228 |
| 4,810,003 | 3/1989 | Pinch et al. | 280/668 |
| 4,958,849 | 9/1990 | Pinch et al. | 280/668 |

FOREIGN PATENT DOCUMENTS

| | | | |
|---|---|---|---|
| 0133743 | 3/1985 | European Pat. Off. | 267/220 |
| 3245948 | 6/1984 | Fed. Rep. of Germany | 403/12 |
| 2310499 | 12/1976 | France | 188/321.11 |
| 2176571 | 12/1986 | United Kingdom | 267/35 |

*Primary Examiner*—Robert J. Oberleitner
*Assistant Examiner*—Peter M. Poon
*Attorney, Agent, or Firm*—A. Michael Tucker

[57] ABSTRACT

An assembly and a method for quickly mounting a damper to a support structure in a vehicle includes an upper mount assembly mounted on a piston rod of a damper prior to assembly of the damper to a mounting tower. As the piston rod is guided through an opening in the mounting tower, a resilient ring is compressed until it passes through the opening. When the ring clears the opening, it expands radially outwardly to a diameter greater than the diameter of the opening, thereby quickly mounting the piston rod and damper to the vehicle.

18 Claims, 3 Drawing Sheets

SNAP-IN UPPER MOUNT ASSEMBLY AND METHOD OF USE

BACKGROUND OF THE INVENTION

1. Field of the Invention

The present invention relates generally to dampers for vehicular suspension systems and, in particular, is concerned with an upper mount assembly and method for quickly mounting a damper to a vehicular body.

2. Description of the Related Art

A typical vehicular suspension system is includes a hydraulic damper, e.g., a strut or a shock absorber, mounted at each wheel to damp spring forces between a sprung body and an unsprung wheel assembly. A lower end of each damper is connected to a wheel assembly by any suitable manner. An upper end of each damper includes a reciprocable piston rod extending therefrom and projecting upwardly. An upper mount assembly secures the piston rod, and thus the damper, to the support structure of the vehicle, usually at a mounting tower formed in the body.

The majority of conventional upper mount assemblies include threaded bolts or fasteners which project upwardly through openings in the mounting tower. Nuts are threaded on the bolts to secure the upper mount assembly to the mounting tower.

U.S. Pat. No. 4,810,003 discloses an upper mount assembly comprising a coned portion carrying a resilient snap ring retainer. As a piston rod mounting the assembly is pushed upwardly through an opening in a mounting tower, the snap ring is squeezed radially inwardly by a decreasing diameter conical wall of the mounting tower. When the snap ring clears the top of the conical wall, it recovers to its uncompressed diameter, greater than the diameter of the upper end of the conical wall, to quickly and precisely lock the strut in an installed position without the use of conventional fasteners.

U.S. Pat. No. 4,958,849 discloses an upper mount assembly for temporarily attaching an upper end of a damper to a vehicle. A plurality of resilient tabs are compressed as they pass through an opening in a mounting tower and then spring to their original diameter to retain the damper on the body during an assembly process. At a later point in the assembly, nuts are threaded onto bolts to secure the damper for normal use.

SUMMARY OF THE INVENTION

The present invention includes an assembly and method for quickly mounting a damper to support structure in a vehicle. An upper mount assembly is mounted on a piston rod of a damper prior to assembly of the damper to a mounting tower. As the piston rod is guided through an opening in the mounting tower, a resilient ring is compressed until it passes through the opening. When the ring clears the opening, it expands radially outwardly to a diameter greater than the diameter of the opening, thereby quickly mounting the piston rod and damper to the vehicle.

DETAILED DESCRIPTION OF THE PREFERRED EMBODIMENTS

Figure 1:
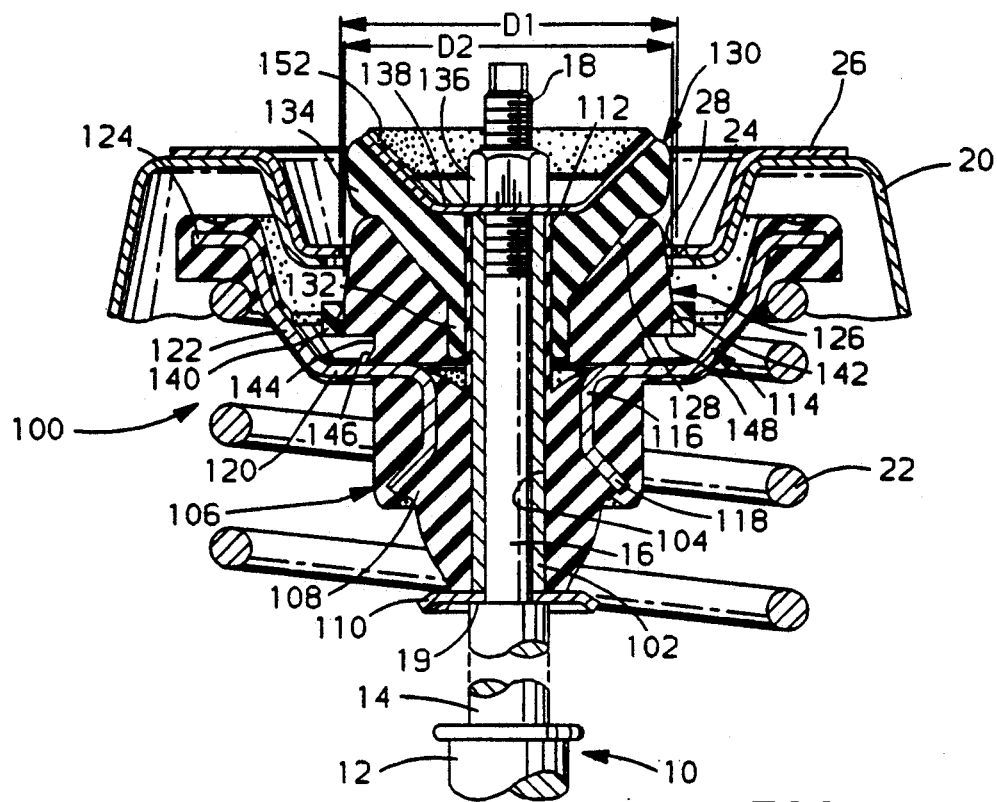
FIG. 1 is an axial sectional view of a first embodiment of the present snap-in upper mount assembly on a piston rod of a damper prior to installation on a vehicular body.

A conventional suspension damper indicated generally at 10 in FIGS. 1-5 includes a reservoir tube 12 adapted at its lower end to be connected by any suitable means to a wheel assembly (not illustrated). The damper 10 is mounted between the unsprung wheel assembly and supporting structure of a vehicle, such as a mounting tower 20, sprung upwardly by a spring 22. The reservoir tube 12 carries an internal reciprocating piston (not illustrated) to dissipate energy resulting from road inputs in a well-known manner. A reciprocating piston rod 14 secured to the piston extends from an upper end of the damper 10 and includes an intermediate reduced-diameter portion 16 and terminates in a threaded portion 18.

The mounting tower 20 is formed as a stamping in the vehicular body in a well-known manner and includes an opening 24. If desired, a mounting cap 26 can be provided at the mounting tower 20 for reinforcement. The mounting cap 26 can be shaped complementary to the mounting tower 20 and includes an opening 28 having a diameter D1.

Figure 2:
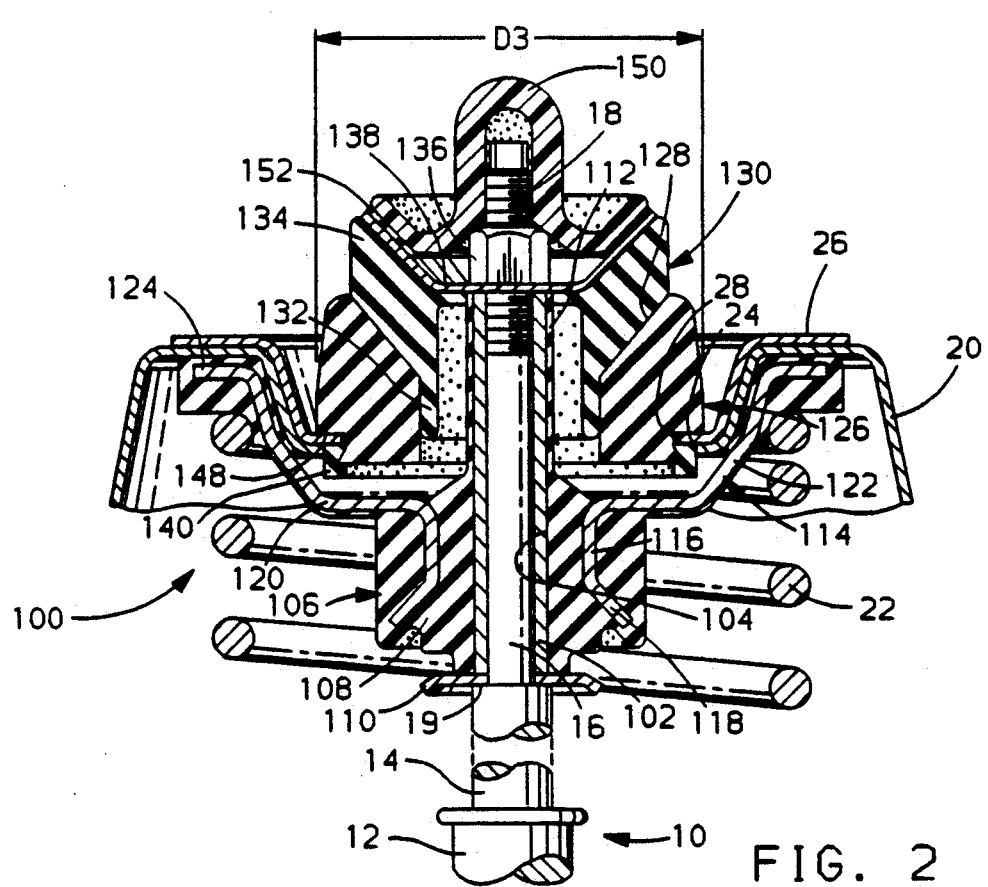
FIG. 2 is a view similar to FIG. 1 after the upper mount assembly and damper have been mounted on the body.

A first embodiment of a snap-in upper mount assembly indicated generally at 100 is illustrated in FIGS. 1 and 2. The assembly 100 is mounted on the reduced-diameter portion 16 and secures the piston rod 14 to the mounting tower 20 as described below. The assembly 100 has at its core a metallic sleeve 102 fitted over the reduced-diameter portion 16 of the piston rod 14. The outer surface of the sleeve 102 is bonded to an inner annular wall 104 of a tubular isolator 106 formed of a suitable rubber or like material which isolates the damper 10 from the mounting tower 20. Preferably, a lower portion 108 of the isolator 106 is of sufficient axial length to provide shear support between the assembly 100 and the damper 10. The sleeve 102 rests on an upper surface of a lower washer 110 seated on a shoulder 19 formed on the piston rod 14. A neck 112 projects upwardly from the lower portion 108 and encircles the remaining axial length of the sleeve 102.

A metallic cup-shaped support 114 includes a downwardly-projecting annular wall 116 embedded in the lower portion 108 of the isolator 106. Preferably, the lower end of the wall 116 has an outwardly projecting flange 118. A central planar portion 120 extends along a top surface of the lower portion 108 to an upwardly sloping annular wall 122 and terminates in a radially outwardly extending flange 124. Preferably, at least a lower surface of the planar portion 120 and the sloping wall 122 are coated by rubber or a like material. Also, a rubber or like material coating is provided on the flange 124, the lower surface of which acts as a seat for the spring 22 while the upper surface isolates the support 114 from the mounting tower 20.

A resilient retaining ring 126 is formed from a suitable material capable of carrying the weight of the damper 10. An upper surface of the retaining ring 126 preferably includes a downwardly-sloping conical inner surface 128 for receiving an elastomeric washer 130. The washer 130 includes a lower annular wall 132 fitted between the neck 112 of the isolator 106 and the retaining ring 126. An upper conical portion 134 of the washer 130 is seated on the inner surface 128 of the retaining ring 126. A nut 136 is threaded on the threaded portion 18 of the piston rod 14 and cooperates with an upper washer 138 to secure the lower washer 110, the isolator 106, the retaining ring 126 and the elastomeric washer 130 on the piston rod 14.

An insertion ring 140 is fitted over the outer surface of the retaining ring 126 to squeeze and compress the retaining ring 126 and the annular wall 132 in a radially inwardly manner so that the compressed or squeezed diameter D2 of an upper portion of the retaining ring 126 can be easily inserted into the opening 28. Preferably, D2 is no greater than D1 and, most preferably, D2 is less than D1. The insertion ring 140 can include an annular notch 142 along its inner surface.

A groove 144 is provided in the outer surface of the lower portion of the retaining ring 126. Preferably, a radially outwardly extending flange 146 having a cross-section complementary to the cross section of the notch 142 is formed on an outer surface of the lower portion of the retaining ring 126.

The damper 10 and the upper mount assembly 100 are positioned beneath the mounting tower 20 as illustrated in FIG. 1. The piston rod 14 and the assembly 100 are urged upwardly through the opening 28 in the mounting cap 26 until an upper surface of the insertion ring 140 engages a lower surface of the mounting cap 26. As the piston rod 14 and the assembly 100 continue upwardly, the insertion ring 140 slides downwardly from a central portion of the retaining ring 126 until the groove 144 seats the mounting cap 26, at which time the retaining ring 126 springs radially outwardly to a relaxed or uncompressed diameter D3 illustrated in FIG. 2 which is greater than the diameter D1 of the opening 28. A supporting surface 148 of the retaining ring 126 rests on the upper surface of the mounting cap 26 to secure the damper 10 to the mounting tower 20. Particularly, the radially inner portion of the lower portion 108 of the isolator 106 is stretched by the weight of the supported damper 10 as illustrated in FIG. 2.

The notch 142 of the insertion ring 140 fits over the flange 146 as the flange 146 springs to a larger relaxed diameter. The insertion ring 140 seated on the flange 146 further isolates the damper 10 from the mounting tower 20. The compressed annular wall 132 assists the upward movement of the retaining ring 126 through the opening 28.

If desired, an insulating cap 150 can be fitted over the threaded portion 18 of the piston rod 14 and seated against an annular elastomeric pad 152 provided on an upper surface of the upper washer 138 to further isolate the upper mount assembly 100. Preferably, the cap 150 is constructed so that it may be mounted on the upper washer 138 prior to insertion of the upper mount assembly 100 through the opening 28.

Figure 3:
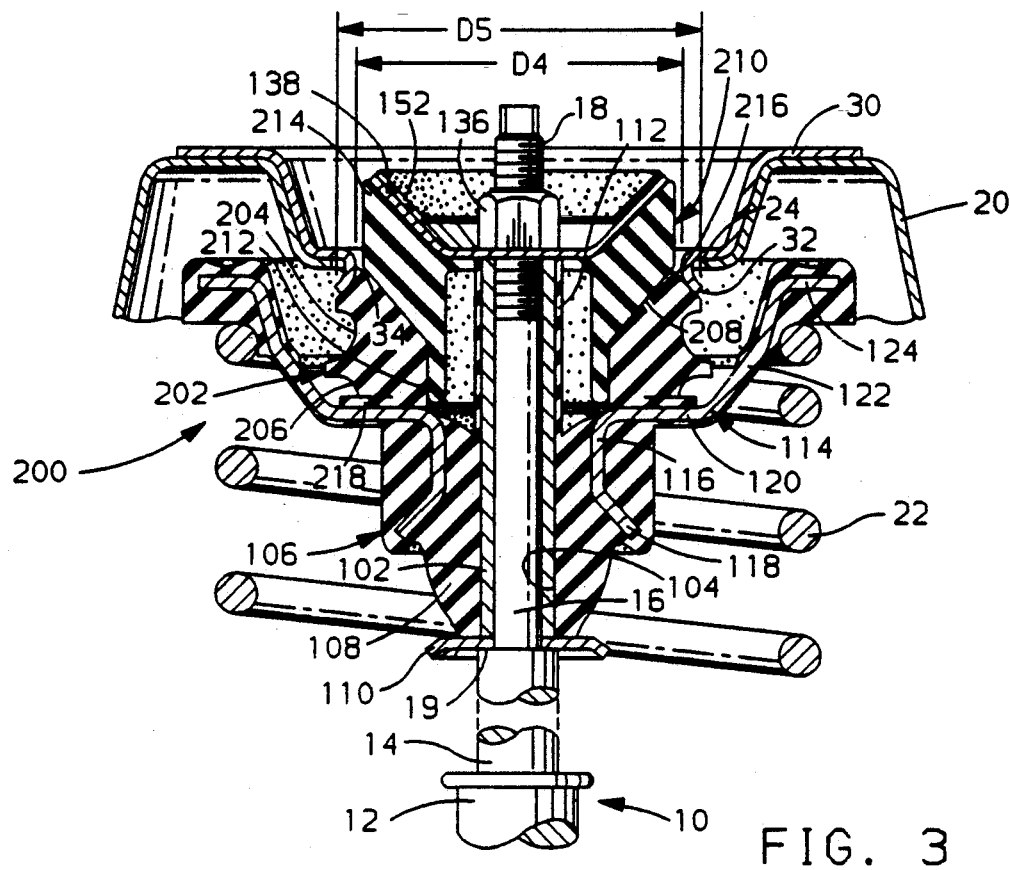
FIG. 3 is an axial sectional view of a second embodiment of the present snap-in upper mount assembly on a piston rod of a damper prior to installation on a vehicular body.
Figure 4:
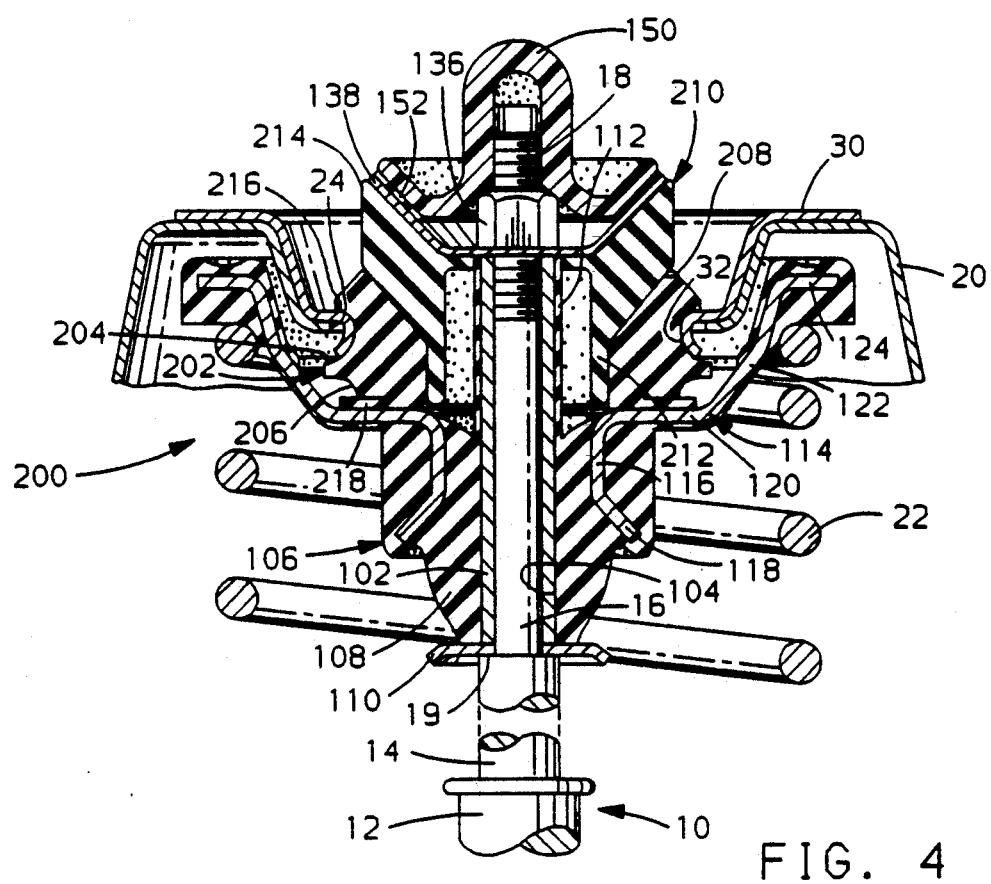
FIG. 4 is a view similar to FIG. 3 after the upper mount assembly has been inserted to a first, temporary position on the body.
Figure 5:
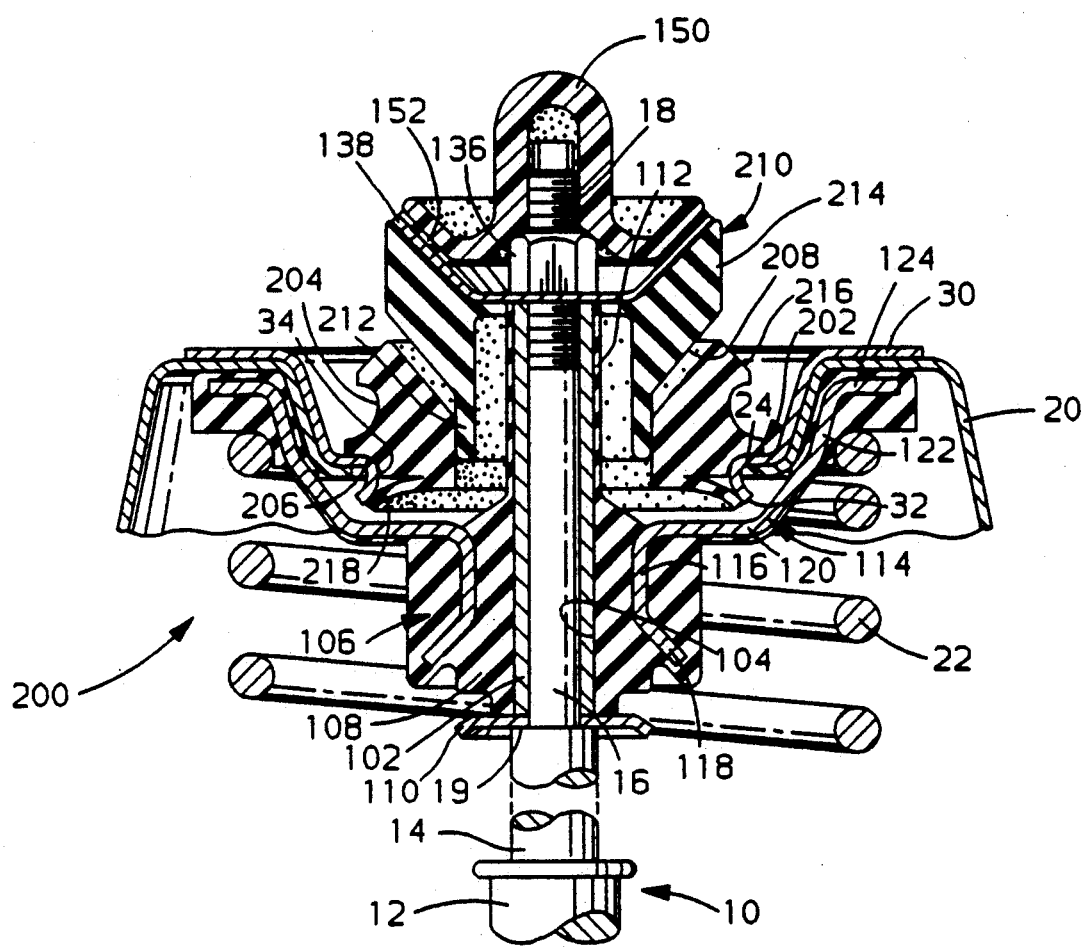
FIG. 5 is a view similar to FIG. 4 after the upper mount assembly has been inserted to a second, operative position on the body.

A second embodiment of the present snap-in upper mount assembly 200 is illustrated in FIGS. 3-5. The assembly 200 provides a two-stage assembly procedure, wherein the first stage requires a relatively small force to temporarily mount the damper 10 and the second stage requires a relatively large force to operatively secure the damper 10 in the mounting tower 20. Common elements found in the assemblies 100 and 200 are identified by the same reference numerals.

A mounting cap 30 for use with the assembly 200 preferably includes a downwardly rolled annular wall 32 at an opening 34 with a diameter D4 for receiving and retaining the piston rod 14 and the assembly 200 as described below.

A resilient retaining ring 202 includes a first or upper groove 204 and a second or lower groove 206 in an outer circumferential surface having a diameter D5 greater than D4. An upper surface of the retaining ring 202 preferably includes a downwardly-sloping conical inner surface 208 for receiving an elastomeric washer 210. The washer 210 includes a lower annular wall 212 fitted between the neck 112 of the isolator 106 and the retaining ring 202. An upper conical portion 214 of the washer 210 is seated on the inner surface 208 of the retaining ring 202. The retaining ring 202 also includes a downwardly-sloping conical outer surface 216 which engages the annular wall 32 as the retaining ring 202 is urged upwardly through the opening 34. Preferably, a flexible annular lip 218 is formed at the lower surface of the retaining ring 202.

At a first stage of mounting, preferably performed by a relatively small force (e.g., by hand), the upper mount assembly 200 is urged upwardly until the annular wall 32 is seated in the upper groove 204 as illustrated in FIG. 4. The portion of the retaining ring 202 between the outer surface 216 and the upper groove 204 and the lower annular wall 212 are compressed radially inwardly to accommodate insertion and then spring radially outwardly so that an annular supporting surface of the retaining ring 202 retains the damper 10. At this point, the damper 10 is temporarily attached at the mounting tower 20 in a manner sufficient for an assembly process.

When a damper 10 has been secured at each wheel assembly, the vehicular body can be lowered so that the weight of the body is supported by the dampers 10 and their respective upper mount assemblies 200. At this point, a relatively large force (e.g., the weight of the body) urges the retaining ring 202 upwardly until the annular wall 32 is seated in the lower groove 206 as illustrated in FIG. 5. The portion of the retaining ring 202 between the upper and lower grooves 204, 206 is compressed radially inwardly to accommodate insertion and then springs radially outwardly to provide a supporting surface to retain the damper 10. The damper 10 is now operatively connected to the mounting tower 20 for normal use. The flange 124 is seated against a lower surface of the mounting tower 20. The lip 218 acts as an isolator between the annular wall 32 and the central portion 120 of the support 124.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. An upper mount assembly for connecting a suspension damper to a support having an opening, comprising:

(a) support means secured to the damper;

(b) resilient retaining ring means, provided on the support means and secured to the damper, having an uncompressed diameter greater than the support opening; and (c) insertion ring means, formed separately from the support and slidably mounted on the retaining ring means, for compressing the retaining ring means to a diameter smaller than the support opening so that the retaining ring means can be inserted through the support opening.

2. The upper mount assembly specified in claim 1 wherein the insertion ring means is fitted over and slidably mounted on the retaining ring means.

3. The upper mount assembly specified in claim 2 wherein:

(a) an annular notch is provided on an inner surface of the insertion ring means; and (b) a radially outwardly extending flange having a cross section complementary to the cross section of the notch is provided on an outer surface of the retaining ring means.

4. An upper mount assembly for mounting a suspension damper having a telescopic piston rod extending from an upper end thereof to a mounting tower in a vehicular body, the mounting tower including an opening for receiving the upper mount assembly and the piston rod, the upper mount assembly comprising:

(a) a tubular isolator seated on the piston rod;

(b) a cup-shaped support having an annular wall embedded in the isolator, a central portion and a radially outwardly extending flange for engaging a lower surface of the mounting tower;

(c) a resilient retaining ring, mounted on the piston rod and seated on the support, having an uncompressed diameter greater then the mounting tower opening;

(d) means for securing the isolator, support and retaining ring on the piston rod; and (e) an insertion ring, formed separately from the mounting tower and slidably mounted on the retaining ring to compress the retaining ring to a diameter smaller than the mounting tower opening so that the retaining ring can be inserted through the mounting tower opening.

5. The upper mount assembly specified in claim 4 wherein the insertion ring is fitted on an outer circumference of the retaining ring.

6. The upper mount assembly specified in claim 4 wherein the retaining ring includes:

(a) an upper portion having a compressed diameter less than the mounting tower opening;

(b) a lower portion having a groove in the outer surface; and (c) a radially outwardly extending flange provided in the lower outer surface.

7. The upper mount assembly specified in claim 6 wherein an annular notch is provided on an inner surface of the insertion ring for receiving the retaining ring flange after the insertion ring is slid from the retaining ring upper portion.

8. The upper mount assembly specified in claim 4 wherein the means for securing the isolator, support and retaining ring on the piston rod includes a nut threaded on the piston rod.

9. The upper mount assembly specified in claim 4 including a cap, mounted on the securing means, having a diameter smaller than the mounting tower opening.

10. An upper mount assembly for connecting a suspension damper to a support having an opening, comprising:

(a) support means secured to the damper; and (b) resilient retaining ring means, provided on the support means, having an uncompressed diameter greater than the support opening and at least a first groove for first-stage seating of the retaining ring means in the support opening and a second groove for second-stage seating of the retaining ring means in the support opening.

11. An upper mount assembly for mounting a suspension damper having a telescopic piston rod to a mounting tower in a vehicular body, the mounting tower including an opening and an annular wall concentrically formed about the opening, the upper mount assembly comprising:

(a) a tubular isolator seated on the piston rod;

(b) a cup-shaped support having an annular wall embedded in the isolator, a central portion and a radially outwardly extending flange for engaging a lower surface of the mounting tower;

(c) a resilient retaining ring, mounted on the piston rod and seated on the support, having an uncompressed diameter greater than the mounting tower opening and at least a first groove for a first-stage seating of the mounting tower annular wall and a second groove for a second-stage seating of the mounting tower annular wall.

12. The upper mount assembly specified in claim 11 including an annular lip on the retaining ring which isolates the mounting tower annular wall from the support central portion when the mounting tower annular wall is received in the second groove.

13. A method of mounting a suspension damper to a vehicular body, the method comprising the steps of:

(a) providing an opening in the body for receiving the damper;

(b) securing support means on the damper;

(c) providing a resilient retaining ring on the support means, the retaining ring having an uncompressed diameter greater than the body opening;

(d) providing a groove in the retaining ring for seating the retaining ring in the body opening;

(e) compressing the retaining ring with an insertion ring formed separately from the body; and (f) inserting the retaining ring through the body opening to slide the insertion ring from the retaining ring so that the retaining ring groove is seated at the body opening.

14. The method specified in claim 13 wherein the insertion ring is fit on an outer circumference of the retaining ring to reduce the diameter of the retaining ring.

15. The method specified in claim 13 wherein the insertion ring slides along the axial length of the retaining ring until the retaining ring is seated in body opening.

16. The method specified in claim 13 wherein a flange on the retaining ring springs radially outwardly into engagement with the insertion ring when the retaining ring is seated in the body opening.

17. A method of mounting a suspension damper to a body opening, comprising the steps of:

(a) securing a support on the damper;

(b) providing a resilient retaining ring on the support, the retaining ring having an uncompressed diameter greater than the body opening;

(c) providing a first groove in an outer circumference of the retaining ring for a first-stage seating in the body opening;
(d) providing a second groove in the outer circumference of the retaining ring for a second-stage seating in the body opening; and
(e) inserting the retaining ring through the body opening to compress the retaining ring until a desired groove is seated in the body opening.

18. The method specified in claim 17 wherein an inclined surface is provided at an upper end of the retaining ring to enhance the compression of the retaining ring as the retaining ring is inserted through the body opening.

* * * * *